(12) United States Patent
Gellert

(10) Patent No.: US 6,454,558 B1
(45) Date of Patent: Sep. 24, 2002

(54) MELT TRANSFER SYSTEM

(76) Inventor: Jobst U. Gellert, 7A Prince Street, Glen Williams, Ontario (CA), L7G 2Z1

(*) Notice: Subject to any disclaimer, the term of this patent is extended or adjusted under 35 U.S.C. 154(b) by 0 days.

(21) Appl. No.: 09/425,237

(22) Filed: Oct. 25, 1999

(30) Foreign Application Priority Data

Aug. 23, 1999 (CA) ............................................. 2280559
Oct. 4, 1999 (CA) ............................................. 2284955

(51) Int. Cl.$^7$ ............................................. B29C 45/12
(52) U.S. Cl. ...................... 425/562; 425/567; 425/572; 425/588; 425/338; 264/328.8
(58) Field of Search ............................... 425/562, 567, 425/569, 572, 574, 588, 338; 264/328.11, 328.8

(56) References Cited

U.S. PATENT DOCUMENTS

| | | | |
|---|---|---|---|
| 2,471,683 A | 5/1949 | Halbach | 18/30 |
| 3,812,228 A | 5/1974 | Skoroszewski | 264/54 |
| RE28,721 E | 2/1976 | Farrell | 425/159 |
| 4,212,626 A | 7/1980 | Gellert | 425/562 |
| 4,244,909 A | 1/1981 | Gellert | 264/297 |
| 4,586,887 A | 5/1986 | Gellert | 425/144 |
| 4,632,652 A | 12/1986 | Farrell | 425/137 |
| 4,828,480 A | 5/1989 | Smith | 425/562 |
| 4,891,001 A | 1/1990 | Gellert | 425/549 |
| 4,954,072 A | 9/1990 | Zimmerman | 425/549 |
| 4,983,117 A | 1/1991 | von Buren et al. | 425/563 |
| 5,011,646 A * | 4/1991 | Bertschi | 264/297.2 |
| 5,044,927 A | 9/1991 | DiSimone et al. | 425/567 |
| 5,154,397 A | 10/1992 | Thomas | 251/328 |
| 5,458,843 A | 10/1995 | Brown | 264/297 |
| 5,474,439 A | 12/1995 | McGrevy | 425/549 |
| 5,540,580 A | 7/1996 | Takada | 425/539 |

FOREIGN PATENT DOCUMENTS

| | | | |
|---|---|---|---|
| DE | 2017802 | 11/1970 | |
| EP | 0 384 883 A2 | 8/1990 | |
| WO | WO 98/41378 | 3/1998 | ............... 425/130 |

* cited by examiner

*Primary Examiner*—James P. Mackey
*Assistant Examiner*—Donald Heckenberg
(74) *Attorney, Agent, or Firm*—Bereskin & Parr

(57) ABSTRACT

A melt transfer system is provided for a stack mold. The melt transfer system includes first and second transfer bushings arranged in opposing platens of the mold. Each transfer bushing defines a portion of a runner passage communicating at shear gates disposed in a shearing surface that is parallel to the direction of opening and closing movement for said platens in order to shear the melt when the platens are moving from a closed position to an open position. In another aspect, the shearing surfaces are normal to the direction of movement of the platens and at least one of the transfer bushings is rotatable relative to the platen for shearing the melt. In another aspect, a transfer bushing is provided having a core formed of an insulative material and a shell formed of a conductive material. The core defines a channel for conducting melt between a shear gate at one end of the channel and an aperture at another end of the channel.

19 Claims, 11 Drawing Sheets

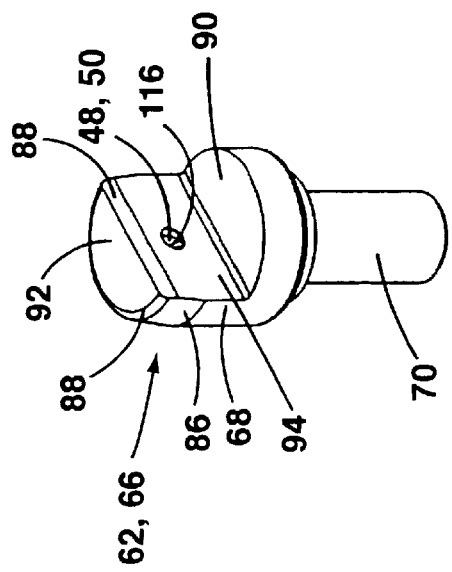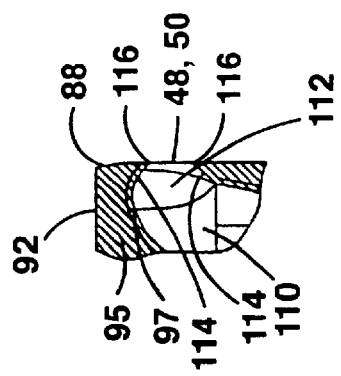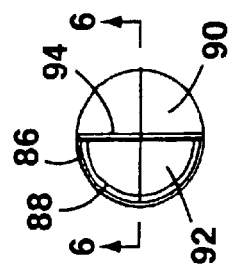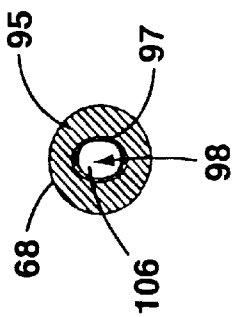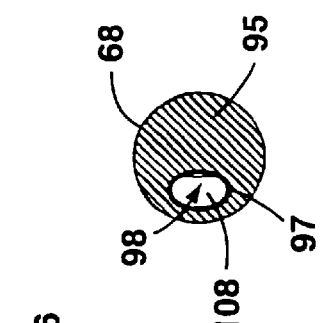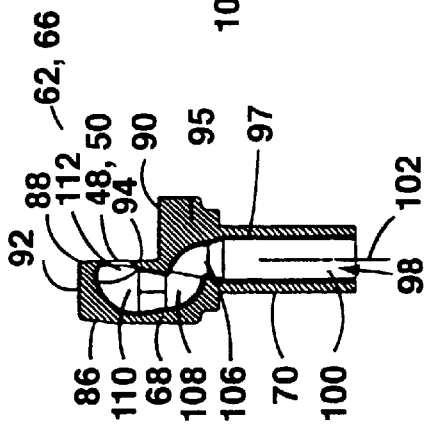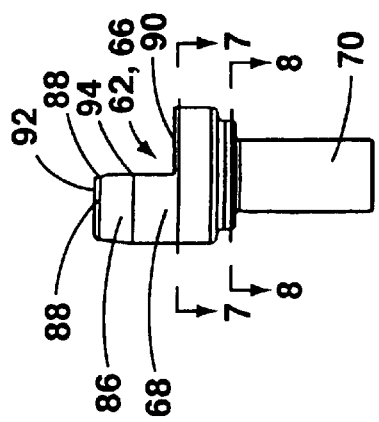

MELT TRANSFER SYSTEM

FIELD OF THE INVENTION

The present invention relates to injection molding and in particular to a melt transfer system for a stack mold.

BACKGROUND OF THE INVENTION

In a stack mold, pressurized melt must be conveyed across a parting line between two platens that are displaceable relative to each other. A melt transfer system is required in order to control the flow of the pressurized melt depending on whether the platens are in contact with each other or are separated.

A valve gated melt transfer system, such as is disclosed in U.S. Pat. No. 4,244,909, controls the flow of melt between platens using a combination of valve gate units. A disadvantage with valve gated melt transfer systems is that pressure variances within the melt passages are experienced due to the presence of valve pins.

A thermal gated melt transfer system, such as disclosed in U.S. Pat. No. 4,586,887, controls the flow of melt between platens using a combination of heated nozzles. A disadvantage with thermal gated melt transfer systems is that the flow of pressurized melt is impeded by the relatively small diameter gate defined in each heated nozzle. Furthermore, there is a delay associated with cooling and remelting the melt in the gate for each molding cycle.

There is a need for a melt transfer system to be developed for stack molds that overcomes the above problems and that is relatively simple in its construction and effective in its operation.

The improved stack mold system is particularly needed for large scale molding operations involving large volumes of melt being transferred at one time. In such cases, it is desirable to have larger diameter melt passages that are not impeded by central valve pins or other obstructions that interfere with the flow of melt within the passages. It is also desirable in such large scale molding operations that drool be controlled in a manner that does not solely rely upon decompression at the injection nozzle as it has been found difficult to achieve a sufficient decompression over long lengths of passages.

SUMMARY OF THE INVENTION

The present invention provides an improved system and method for conducting pressurized melt between platens in a stack mold.

In one aspect the invention provides a melt transfer bushing comprising:
   a body defining a channel for conducting a pressurized melt between a shear gate at one end of said channel and an aperture at another end of said channel, wherein said shear gate is defined in a plane that is not parallel to the plane in which said aperture is defined.

In another aspect the invention provides a melt transfer bushing comprising:
   a body defining a channel for conducting a pressurized melt between a shear gate at one end of said channel and an aperture at another end of said channel, wherein said shear gate is defined by a circumferential edge forming an acute angle relative to the plane of said shear gate[00ab] A melt transfer bushing comprising:
   a body defining a channel for conducting a pressurized melt between a shear gate at one end of said channel and an aperture at another end of said channel, wherein said shear gate is defined by a circumferential edge forming an acute angle relative to the plane of said shear gate.

In another aspect the invention provides a melt transfer bushing comprising:
   a core formed of an insulative material, said core defining a channel for conducting a pressurized melt between a shear gate at one end of said channel and an aperture at another end of said channel; and
   a shell formed of a conductive material surrounding said core between said shear gate and said aperture.

In another aspect the invention provides a melt transfer system for a stack mold having a first platen and a second platen, the second platen moving between an open position and a closed position relative to the first platen and cooperating with the first platen to define at least one mold cavity when in said closed position, the melt transfer system comprising:
   a first transfer bushing disposed in the first platen defining at least a portion of a first runner passage for conducting pressurized melt from a melt inlet to a first shear gate, said first shear gate being defined in a first shearing surface disposed in said first transfer bushing in a plane extending generally parallel to the direction of opening and closing movement of said first and second platens; and
   a second transfer bushing disposed in the second platen defining at least a portion of a second runner passage for conducting pressurized melt from a second shear gate to a distribution manifold, said second shear gate being defined in a second shearing surface disposed in said second transfer bushing in a plane extending generally parallel to said first shearing surface;
   wherein said first and second shear gates are in communication to facilitate flow of pressurized melt from said first runner passage to said second runner passage when the first and second platens are in a closed position, and wherein said pressurized melt is sheared at said first and second shear gates by said first and second shearing surfaces when the first and second platens move from a closed position to an open position.

In another aspect the invention provides a melt transfer system for a stack mold having a first platen and a second platen, the second platen moving between an open position and a closed position relative to the first platen and cooperating with the first platen to define at least one mold cavity when in said closed position, the melt transfer system comprising:
   a first runner passage defined in the first platen for conducting a pressurized melt from a melt inlet to a first shear gate;
   a second runner passage defined in the second platen for conducting said pressurized melt from a second shear gate to a distribution manifold;
   a first bushing assembly defining at least a portion of said first runner passage and having a first bearing surface into which said first shear gate is defined;
   a second bushing assembly defining at least a portion of said second runner passage and having a second bearing surface into which said second shear gate is defined, said first and second bearing surfaces contacting each other when said first and second platens are in a closed position;
   means for moving at least one of said first and second bushing assemblies between a flow position, where said first and second platens are in a closed position and said first and second shear gates are in communication to facilitate flow of pressurized melt from said first runner passage to said second runner passage, and a shear position, where melt at said first shear gate is sheared by said second bearing surface an melt at said second shear gate is sheared by said first bearing surface to prevent flow of pressurized melt from said first runner passage to said second runner passage.

DESCRIPTION OF THE DRAWINGS

For a better understanding of the present invention, and to show more clearly how it may be carried into effect, reference will now be made by way of example to the accompanying drawings. The drawings show preferred embodiments of the present invention, in which:

FIG. 3 is a perspective view of a transfer bushing for the melt transfer system of FIG. 1;

FIG. 4 is a side view of the transfer bushing of FIG. 3;

FIG. 5 is a top view of the transfer bushing of FIG. 3;

FIG. 6 is a sectional view of the transfer bushing as viewed along lines 6—6 of FIG. 5;

FIG. 6A is an enlarged sectional view of the transfer bushing as shown in FIG. 6;

FIG. 7 is a sectional view of the transfer bushing as viewed along lines 7—7 of FIG. 4;

FIG. 8 is a sectional view of the transfer bushing assembly as viewed along lines 8—8 of FIG. 4.

DETAILED DESCRIPTION OF THE PREFERRED EMBODIMENT

Figure 1:
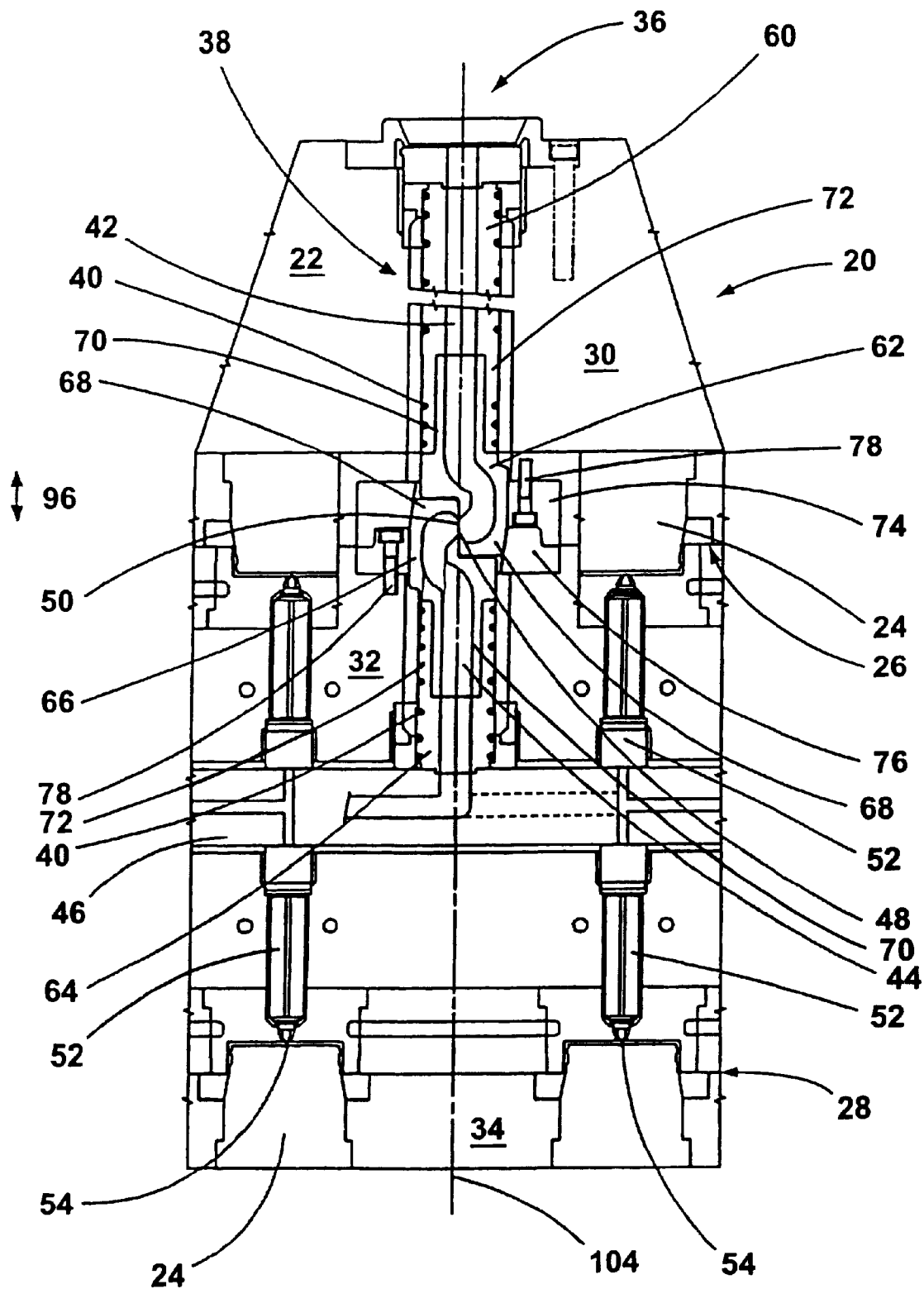
FIG. 1 is a partial sectional view of a melt transfer system in accordance with the present invention disposed in a portion of a stack mold, the stack mold being in an open position.

Referring to FIGS. 1 to 8, a melt transfer system in accordance with the present invention is shown generally at 20. The melt transfer system 20 is located within a stack mold (or multi-level mold) 22. Stack mold 22 has a plurality of cavities 24 located on a first parting line 26 and on a second parting line 28. The first parting line 26 extends between a stationary platen 30 and a central moving platen 32 and the second parting line 28 extends between the central moving platen 32 and a secondary moving platen 34. Stack molds 22 of this type are well known in the art, as described in U.S. Pat. Nos. 4,212,626 and 4,244,909 to Gellert, both of which are incorporated herein by reference.

A molding machine inlet 36 is defined in the stationary platen 30 to accept the nozzle (not shown) of an injection molding machine. In communication with molding machine inlet 36 is a heated runner system 38, which is heated by heater windings 40 or any other means known in the art sufficient to maintain the melt therein at a desired temperature. Runner system 38 comprises a first runner passage 42, in stationary platen 30, and a second runner passage 44, in central moving platen 32, in communication with a distribution manifold 46. Runner passages 42,44 communicate via first and second shear gates 48, 50. Manifold 46 communicates with each mold cavity 24 via a nozzle 52 having a thermally gated mold cavity gate 54.

The first and second runner passages 42, 44 of the melt transfer system 20 are defined by first transfer nozzle 60 and first transfer bushing 62 located in stationary platen 30 and second transfer nozzle 64 and second bushing 66 located in central moving platen 32.

Each transfer bushing 62, 66 has a head 68 and a stem 70. The head 68 protrudes beyond the parting line 26 of the stationary and central moving platens 30, 32. The stem 70 is received within a collar 72 defined in each transfer nozzle 60, 64. The first and second bushings 62, 66 are mounted to the stationary and central moving platens 30, 32 with first and second locating rings 74, 76 and bolt fasteners 78. First locating ring 74 defines a recess 80 for receiving a corresponding neck 82 protruding from the second locating ring 76. Each locating ring 74, 76 defines a camming surface 84 for engaging a following surface 86 defined on the head 68 of each transfer bushing 62, 66. When the stationary and central moving platens are closing, the following surface 86 bears against the camming surface 84 to guide the heads 68 of the transfer bushings 62, 66 into close engagement with each other. The heads 68 of the transfer bushings 62, 66 also have a chamfered edge 88 to prevent the opposing head 68 from becoming caught when the stationary and central moving platens 30, 32 are closing. A shoulder 90 is defined on each transfer bushing 62, 66, for abuttably receiving the end 92 of the head 68 of the opposing transfer bushing 62, 66. First and second shear gates 48, 50 are defined in a shearing surface 94 located on each transfer bushing 62, 66. The shearing surface 94 extends generally parallel to the direction of movement 96 of the stationary and central moving platens 30, 32.

Referring to FIGS. 3 to 8, the structure of each transfer bushing 62, 66 may be seen more clearly. Each transfer bushing 62, 66 has an outer shell 95 formed of a conductive material such as steel or other metals and an inner core 97 formed of an insulative material such as ceramic. The outer shell 95 and inner core 97 are preferably formed by casting to allow melt channel 98 defined in inner core 97 to be formed to precise dimensions with smooth surfaces to optimize the rheological properties of the melt channel 98.

At the stem 70 of the transfer bushing 62, 66, the melt channel 98 has a first portion 100 that extends along an axis 102 corresponding to the primary axis 104 for the first and second runner passages 42, 44. The melt channel 98 has a first bend 106 connecting the first portion 100 to a second portion 108 and a second bend 110 connecting the second portion 108 to a tapered portion 112 leading to the shear gate 48, 50. The cross-sectional shape of the melt channel 98 varies over its length. This reduces shear stress on the melt as it passes along the melt channel 98 and reduces pressure variances at points where the channel 98 changes direction. At the first portion 100, the melt channel 98 has a circular cross-sectional shape. At the first bend 106 and second portion 108, the shape changes to an oval shape that is elongate in a direction that is parallel to the shearing surface 94. The cross-sectional area of the melt channel 98 remains constant from the first portion 100 to the tapered portion 112. At the tapered portion 112, the cross-sectional area is reduced to form a plug in the melt as discussed further below.

Referring to FIG. 6A, it may be seen that the tapered portion 112 of the melt channel 98 is defined by inclined wall 114. The inclined wall 114 defines an acute circumferential edge 116 for the shear gate 48, 50 (preferably wall 114 is inclined at 45 degrees relative to shearing surface 94 however greater or lesser acute angles may be chosen to suit the properties of the melt being sheared). The acute edge 116 helps to cut the melt at the shear gate 48, 50 as the stationary and central moving platens 30, 32 are moved from a closed position to an open position. The inclined wall 114 and tapered portion 112 and the resulting reduction in cross-sectional area of the melt channel at the shear wall 48, 50 helps to form a plug in the sheared melt that resists drooling when the stationary and central moving platens 30, 32 are in an open position. The plug is formed by cooling of the exposed surface of the sheared melt at the shear gate 48, 50 as the melt contacts the cool shearing surface 94 of the opposing transfer bushing 62, 66 when the stationary and central moving platens 30, 32 are moved to an open position. Once the stationary and central moving platens 30, 32 are opened, the plug is sufficiently hardened to stop drool from escaping from the gate 48, 50. Meanwhile, melt disposed in the melt channel 98 behind the plug remains fluid due to the insulation provided by the inner core 97 and the heat provided by heater windings 40. A further reduction in drool in provided in the first runner passage 42 by retracting the barrel of the injection nozzle (not shown) of the injection molding machine to impart a decompression in the melt.

In use, a central processing unit (CPU—not shown) moves the mold 22 to place the stationary platen 30, the central moving platen 32 and the secondary moving platen 34 into a closed position (as shown in FIG. 1). In this position, pressurized melt is permitted to flow from the molding machine sequentially through first runner passage 42, across first parting line 26, through second runner passage 44 and into manifold 46 for delivery to the mold cavities 24. Once the mold cavities 24 are filed, the molding pressure is maintained to apply a packaging pressure, as is known in the art.

Figure 2:
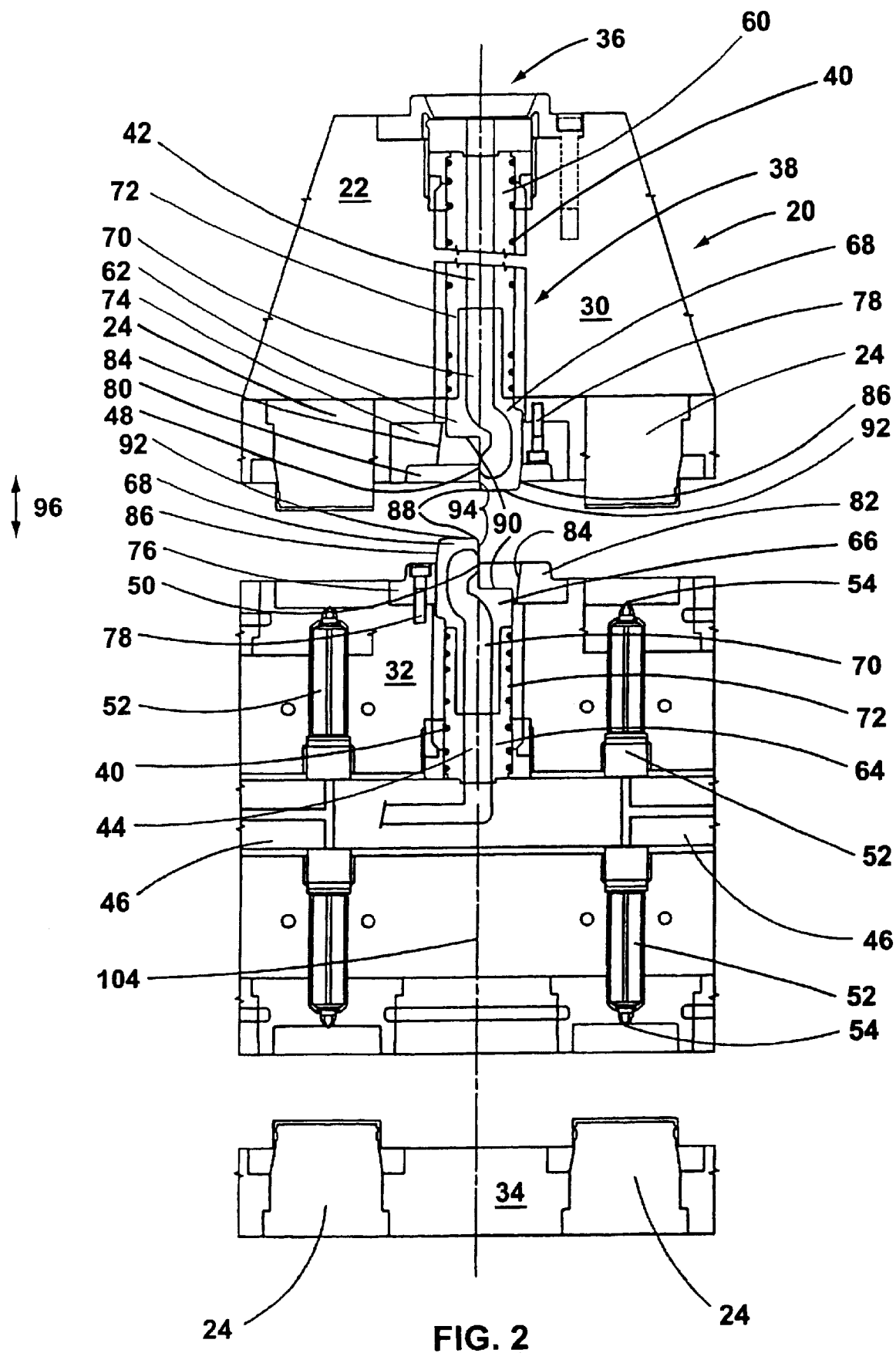
FIG. 2 is a partial sectional view of the melt transfer system of FIG. 1, with the stack mold in a closed position.

Referring to FIG. 2, upon completion of the packing phase the CPU opens the mold 22 along first parting line 26 and second parting line 28. At the same time, the CPU retracts the barrel of the injection nozzle (not shown) of the injection molding machine to impart a decompression in the melt in the first runner passage 42. As the stationary platen 30 and the central moving platen 32 are moved away from each other the melt is sheared by the sharp edge 116 at the first and second shear gates 48, 50. The exposed surface of the sheared melt cools at each shear gate 48, 50 upon contact with shearing surface 94 of the opposing transfer bushing 62, 66 to form a plug in tapered portion 112 that resists drooling. The melt located within the melt channel 98 remains hot due to the insulation provided by inner core 97 and heat applied by heater windings 40. Once the stack mold 22 has been opened, the molded parts may be ejected from the cavities 24 and the mold may then be closed and the molding machine readied for the next molding cycle.

As the stationary and central moving platens 30, 32 are moved from an open position to a closed position, the following surface 86 of each transfer bushing 62, 66 engages the camming surface 84 of each locating ring 74. The heads 68 of each transfer bushing 62, 66 are thus guided into close engagement with each other such that shear gates 48, 50 are aligned in immediate proximity to each other. Alignment of the shear gates is further aided by the abutable engagement of the ends 92 of each transfer bushing 62, 66 with shoulders 90 of the opposing transfer bushing 62, 66. Further alignment is provided by the engagement of the neck 82 of second locating rings 76 with the recess 80 defined in the first locating ring 74.

It has been found that care is required in controlling the temperature of the transfer bushing 62, 66 at the area of the shear gate 48, 50 and shearing surface 94. Insulation or additional heater windings 40 may be located in these areas of the transfer bushing 62, 66 to vary the temperature as desired adjacent to the shear gate 48, 50.

Referring to FIGS. 9 to 12, a second embodiment of the melt transfer system 20 is shown. For convenience, corresponding elements to those described above have been given corresponding reference numerals.

The second embodiment of melt transfer system 20 includes first and transfer bushings 62, 66 having stems 70 seated in collars 72 of first and transfer nozzles 60, 64. The first and second transfer bushings 62, 66 have first and second shear gates 48, 50 defined in shearing surfaces 94. A first runner passage 42 is defined through the first transfer nozzle 60 and the first transfer bushing 62 and a second runner passage 44 is defined through the second nozzle 64 and the second transfer bushing 66.

At least one of the first and second transfer bushings 62, 66 is rotatable about primary axis 104 relative to the first and second transfer nozzles 60, 64. The first and second transfer bushings 62, 66 are movably supported in the stationary and central moving platens 30, 32 with bolt fasteners 150 extending through slots 152 defined in retaining rings 154 that extend about the circumference of the first and second transfer bushings 62, 66.

Lever arm 200 is disposed on the second transfer bushing 66 for pivotally receiving a camrod 202 secured by a pin 204. The camrod 202 is actuated by a piston and cylinder assembly 206. The piston and cylinder assembly 206 is controlled, synchronized and actuated by the CPU. Actuation of the piston and cylinder assembly 206 causes the camrod 202 to extend or retract and in turn move the lever arm 200 to rotate the second transfer bushing 66 about primary axis 104 relative to the first transfer bushing 62. A pin 210 extends from the first transfer bushing 62 into the stationary platen 30 to secure the first transfer bushing 62 from moving relative to the stationary platen 30.

While the second embodiment provides for rotary movement of the second transfer bushing 66 by the camrod 202, it is contemplated that the first transfer bushing 62 could be moved in addition to, or instead of, movement of the second transfer bushing 66 movement (ie. by connecting a piston and cylinder assembly 206 and camrod 202 to the first transfer bushing 60).

Figure 9:
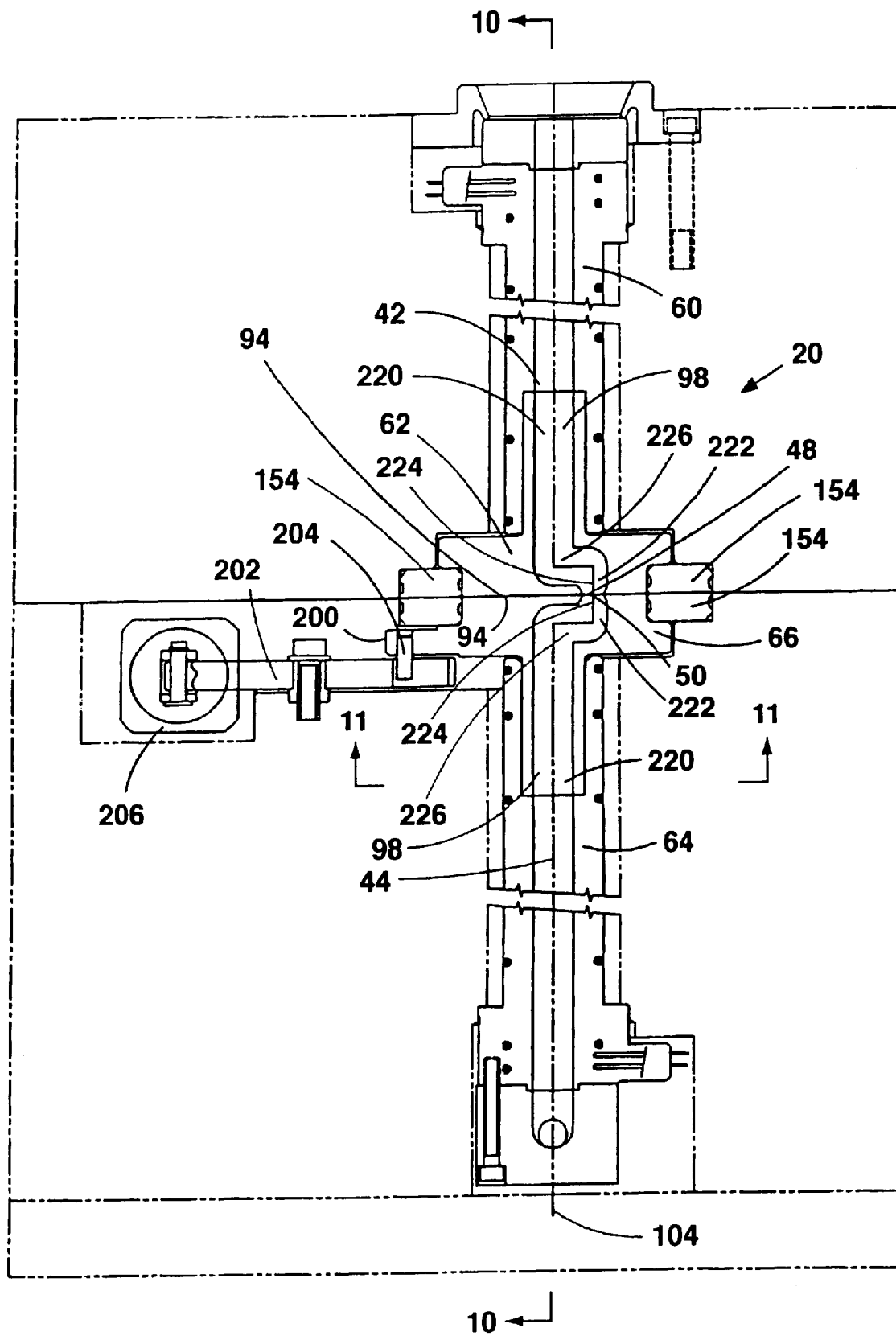
FIG. 9 is a partial sectional view of a second embodiment of a melt transfer system in accordance with the present invention disposed in a portion of a stack mold, the melt transfer system being in a flow position.
Figure 10:
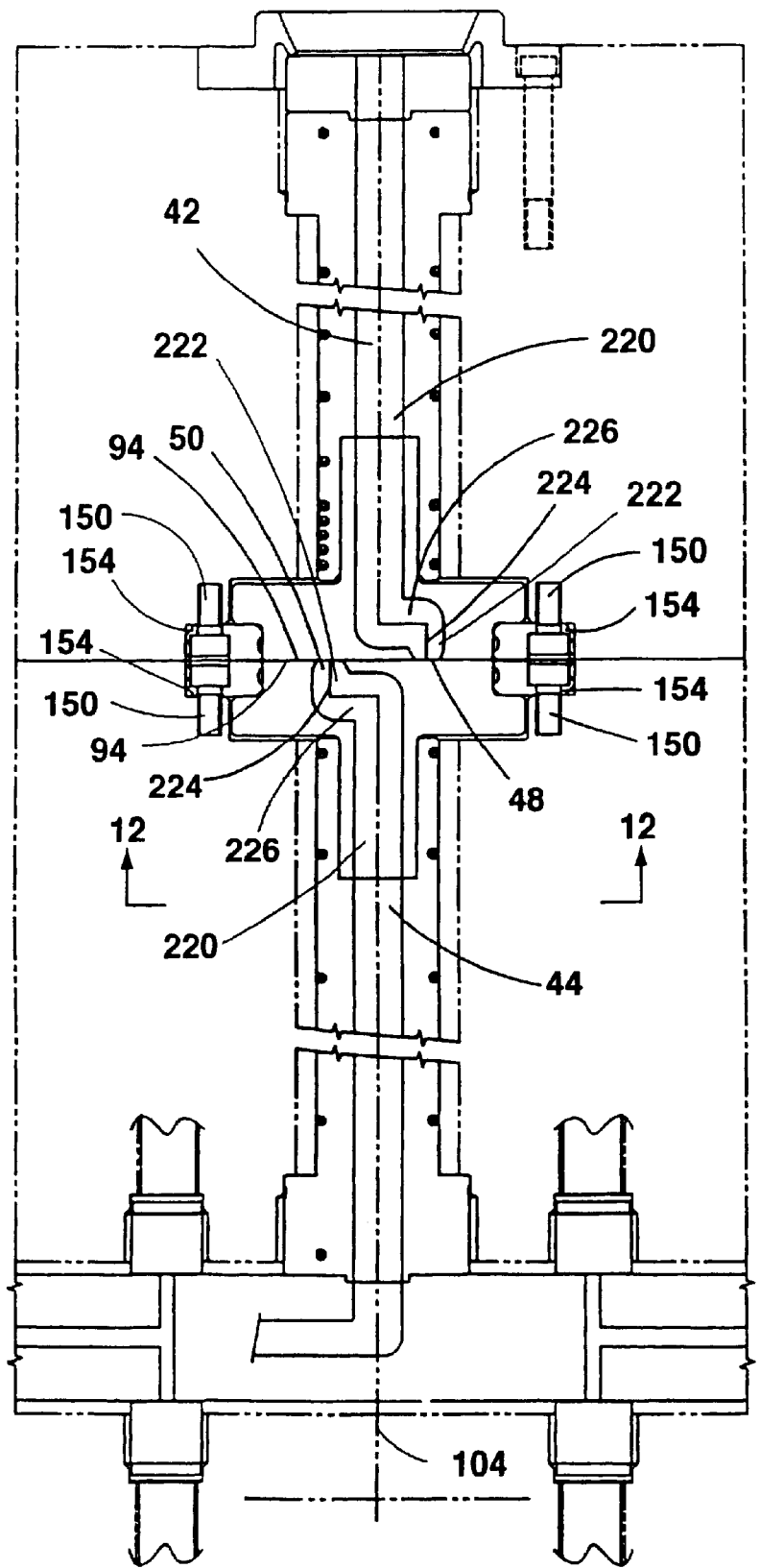
FIG. 10 is a sectional view of the melt transfer system of FIG. 9 as viewed along lines 10—10, with the melt transfer system in a shear position.
Figure 11:
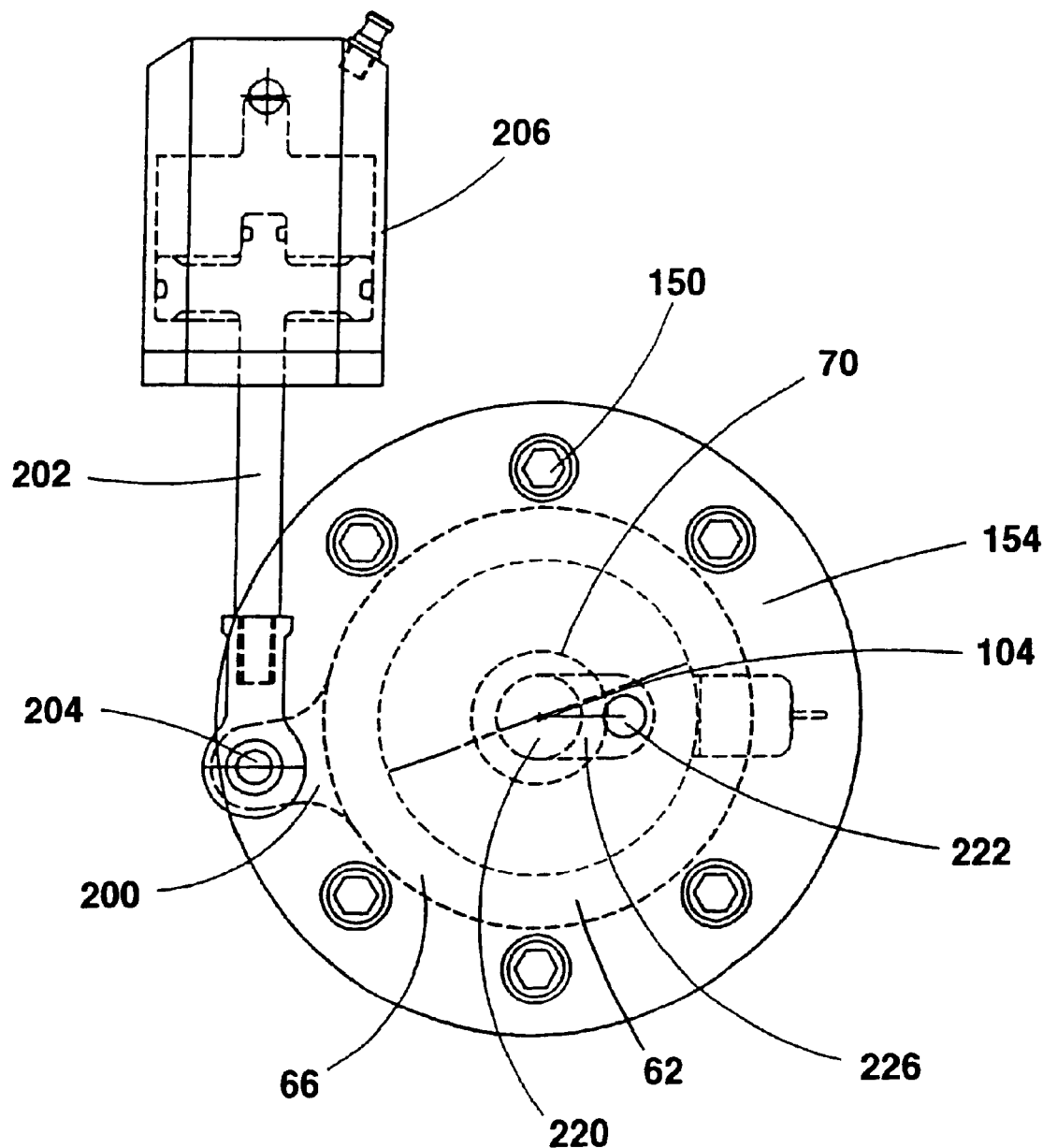
FIG. 11 is a sectional view of the melt transfer system of FIG. 9 as viewed along lines 11—11, with the melt transfer system in a flow position.
Figure 12:
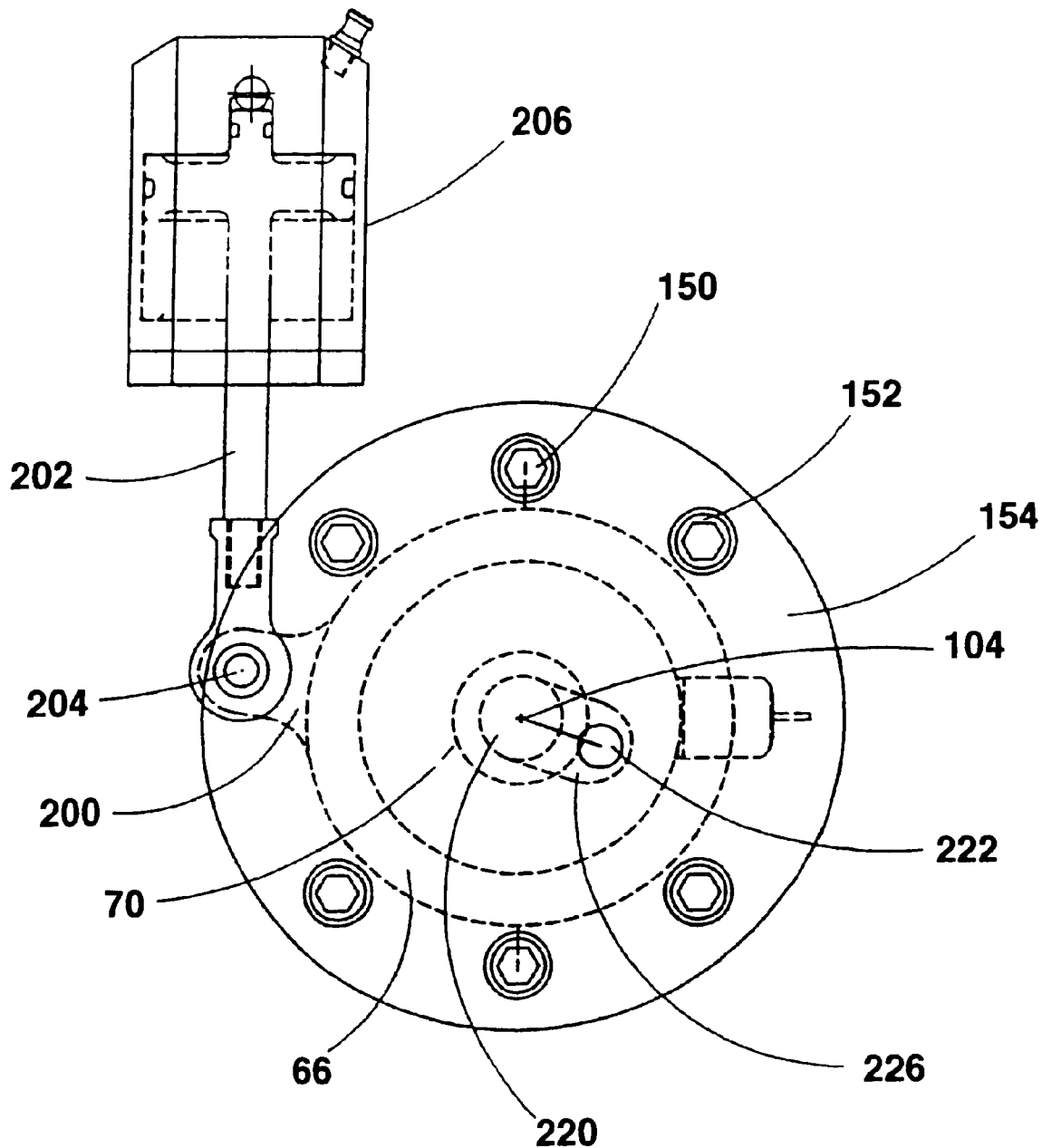
FIG. 12 is a sectional view of the melt transfer system of FIG. 9 as viewed along lines 11—11, with the melt transfer system in a shear position.
Figure 13:
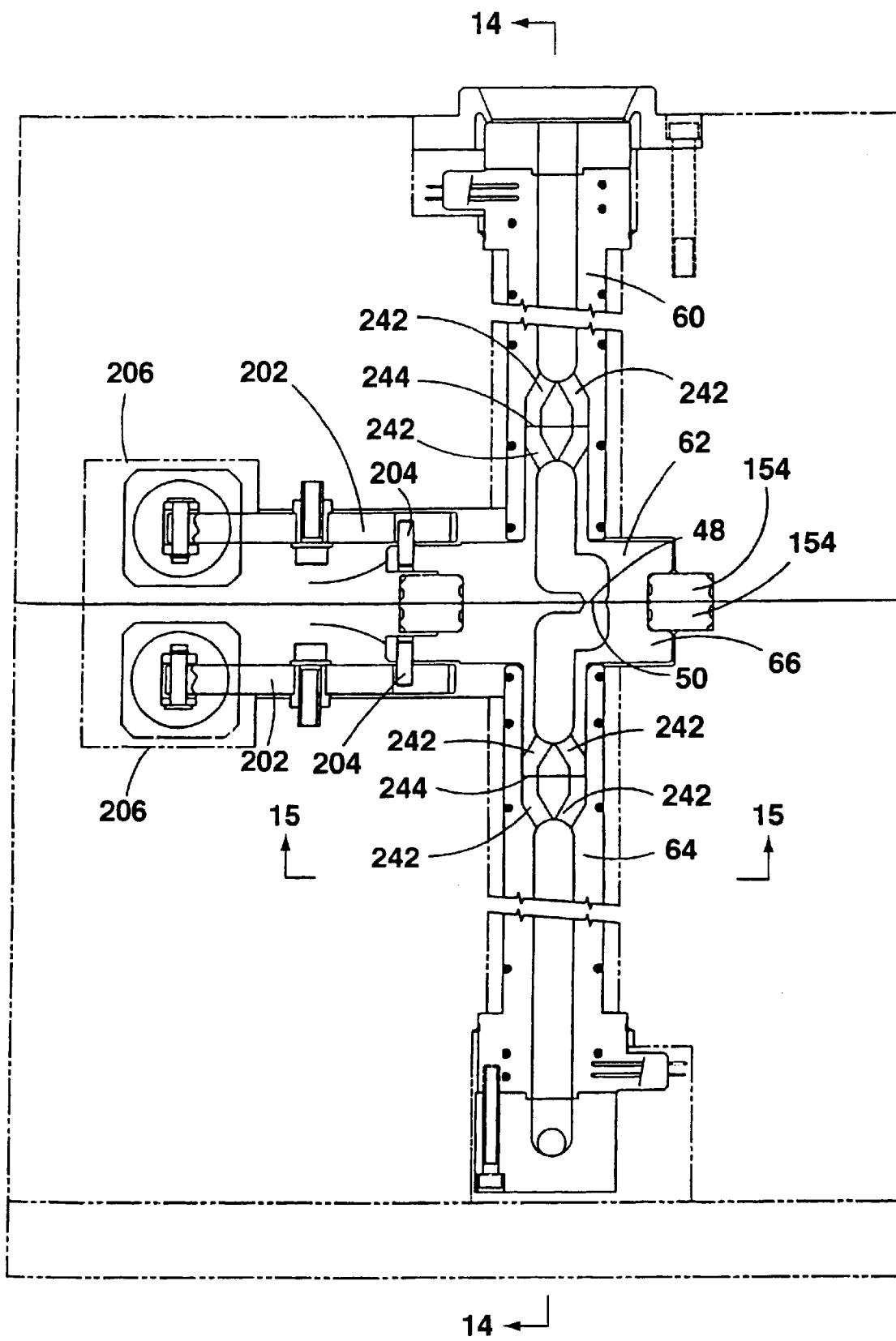
FIG. 13 is a partial sectional view of a third embodiment of a melt transfer system in accordance with the present invention disposed in a portion of a stack mold, the melt transfer system being in a flow position.
Figure 14:
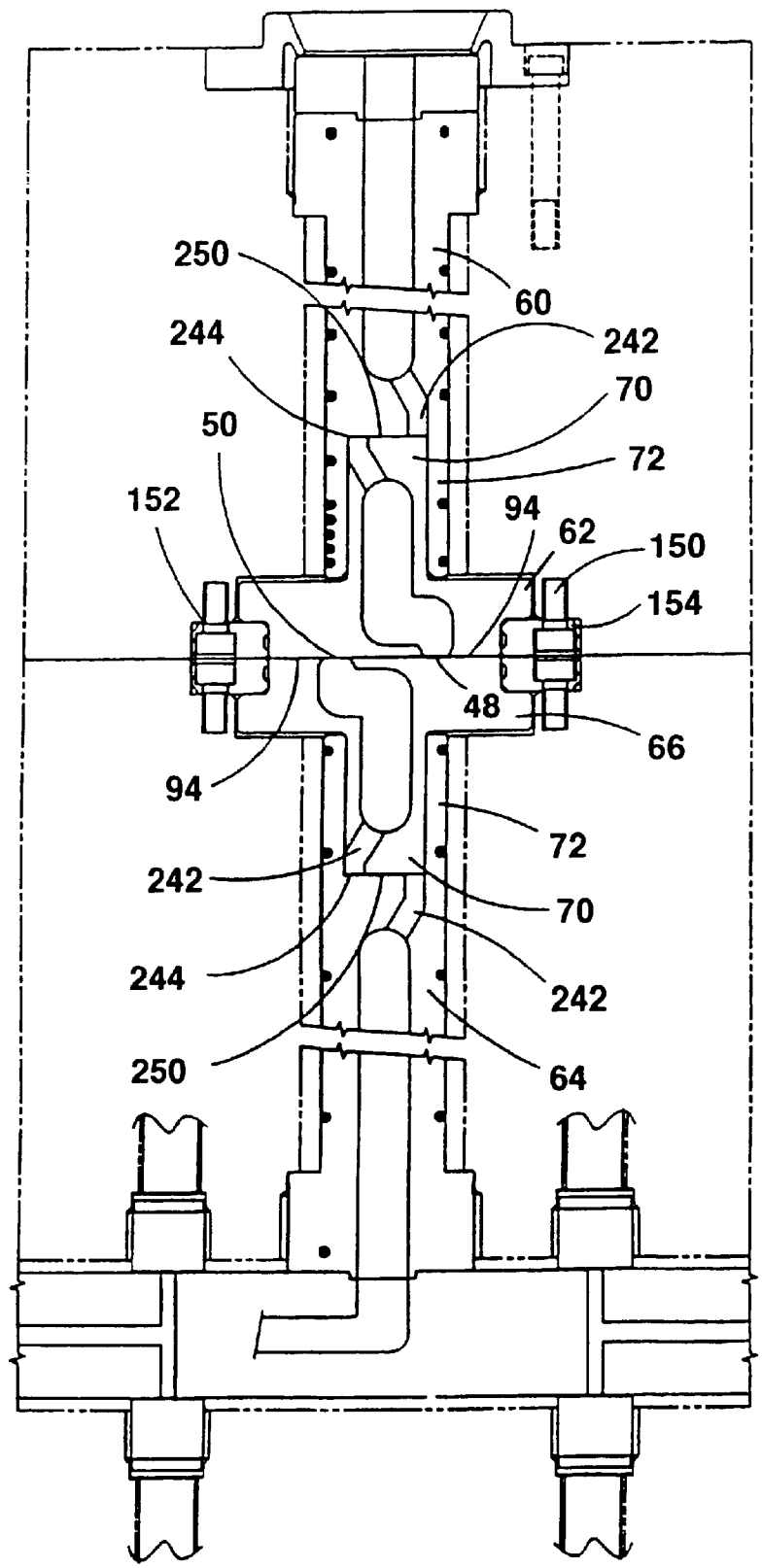
FIG. 14 is a sectional view of the melt transfer system of FIG. 13 as viewed along lines 14—14, with the melt transfer system in a shear position.
Figure 15:
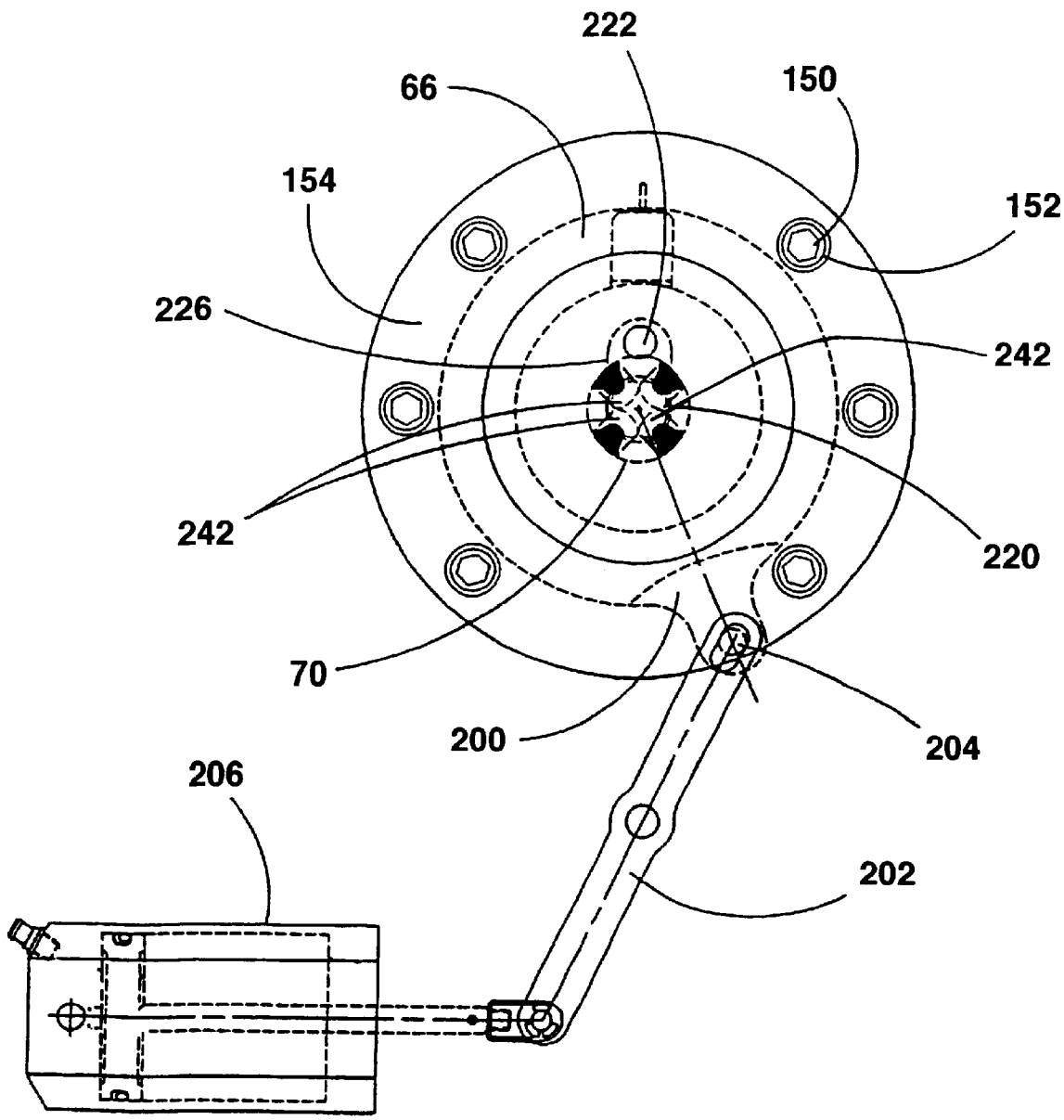
FIG. 15 is a sectional view of the melt transfer system of FIG. 13 as viewed along lines 15—15, with the melt transfer system in a flow position.
Figure 16:
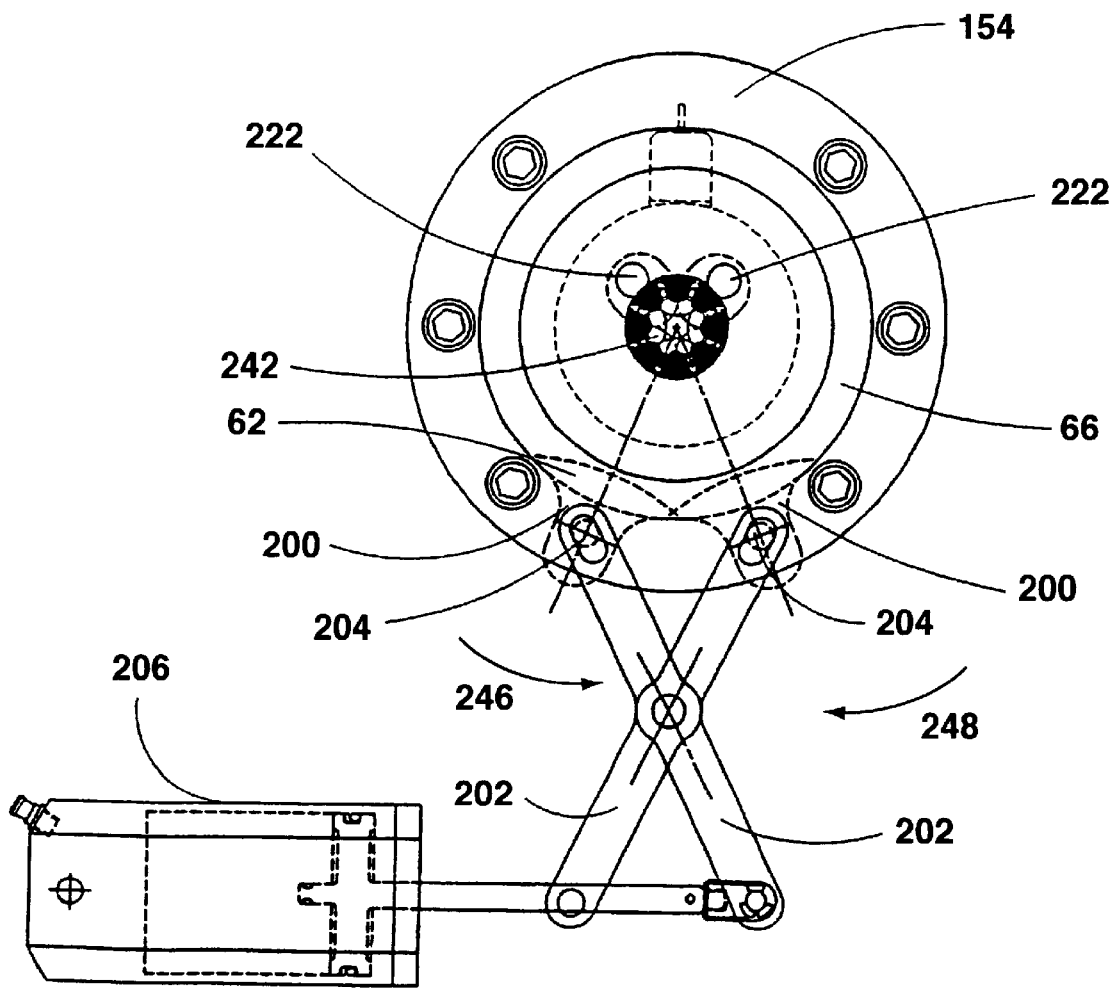
FIG. 16 is a sectional view of the melt transfer system of FIG. 13 as viewed along lines 15—15, with the melt transfer system in a shear position.

Each transfer bushing 62, 66 defines a melt channel 98 having a center portion 220 and an eccentric portion 222 extending respectively along parallel axes 104 and 224 and fluidly connected by a transverse portion 226. The center portion 220 extends along the primary axis 104 for the second transfer bushing 66. When the melt transfer system 20 is in a flow position, with the stationary and central moving platens 30, 32 in a closed position, as shown in FIGS. 9 and 11, the shear gates 48, 50 of the respective eccentric portions 222 align to permit melt to flow between the first and second transfer bushings 62, 66. When the melt transfer system 20 is moved to a shear position, as shown in FIGS. 10 and 12, the melt is sheared and the gates 48, 50 are closed by the shearing surface 94 of the opposing transfer bushings 62, 66. At the same time as the melt transfer system 20 is moved to a shear position, a decompression is imparted in the first runner passage 42 to control drool at the gate 48 when the mold is parted at parting line 26. Decompression is imparted in the runner passage 42 by any means known in the art such as retracting the barrel of the nozzle (not shown) of the injection molding machine as described above.

The operation of melt transfer system 20 as synchronized with mold injection will now be described. Referring to FIGS. 9 and 11, the CPU moves the mold to place the stationary and central moving platens 30, 32 into a closed position and the CPU then actuates piston and cylinder assembly 206 to move second transfer bushing 66 and in turn second shear gate 50 to its "flow" position relative to first transfer bushing 62 and first shear gate 42. In this position, pressurized melt is permitted is to flow from the molding machine sequentially through first runner passage 42, across parting line 26 through second runner passage 44 and into manifold 40 for delivery to the mold cavities. Once the mold cavities are filled, the molding pressure is maintained to apply a packing pressure, as is known in the art.

Referring to FIGS. 10 and 12, upon completion of the packing phase, the CPU actuates piston and cylinder assembly 206 to move second transfer bushing 66 to a "shear" position relative to first transfer bushing 62. The pressurized melt is sheared at the first shear gate 48 and the first shear gate 48 is temporarily closed by the shearing surface 94 of the second transfer bushing 66. The CPU at the same time retracts the barrel of the injection nozzle (not shown) of the injection molding machine to impart a decompression in the melt in the first runner passage 42. The stack mold 22 may now be opened (under control of the CPU), along first parting line 26 and second parting line (not shown) to permit the molded parts to be ejected from the mold 22. The decompression imparted in the first runner passage 42 prevents melt from drooling from the first shear gate 48. Once the molded parts have been ejected from the mold 22, the mold 22 may be closed and the molding machine readied for the next molding cycle.

Referring to FIGS. 13 to 16, a third embodiment of the melt transfer system in accordance with the present invention is shown at 20. For convenience, corresponding elements to those described above have been given corresponding reference numerals.

The third embodiment of melt transfer system 20 includes divided runner passages 242 defined in the first and second runner passages 42, 44 at interfaces 244 between the first and second transfer nozzles 60, 64 and the first and second transfer bushings 62, 66.

The first and second transfer bushings 62, 66 each include lever arms 200 for pivotally engaging camrods 202 that are actuated by piston and cylinder assemblies 206. The actuation of piston and cylinder assemblies 206 by CPU causes first transfer bushing assembly 62 to rotate in a first direction 246 and the second transfer bushing assembly 66 to rotate in a second direction 248 that is opposite to the first direction 246. Rotation of the transfer bushings 62, 66 causes the divided runner passages 242 to become closed by shearing surfaces 250 defined on the collar 72 and stem 70 of the transfer nozzles 60, 64 and transfer bushings 62, 66 at interfaces 244.

In use, the CPU actuates the piston and cylinder assemblies 206 to rotate each of the first and second bushings 62, 64 in opposing directions 246, 248 between a flow position and a shear position. The synchronization of the movement of the transfer bushings 62, 66 with the remaining operations in the molding process is the same as the process as described above.

It is to be understood that what has been described is a preferred embodiment to the invention. If the invention nonetheless is susceptible to certain changes and alternative embodiments fully comprehended by the spirit of the invention as described above, and the scope of the claims set out below.

I claim:

1. A melt transfer system for a stack mold having a first platen and a second platen, the second platen moving between an open position and a closed position relative to the first platen and cooperating with the first platen to define at least one mold cavity when in said closed position, the melt transfer system comprising:

a first transfer bushing disposed in the first platen defining at least a portion of a first runner passage for conducting pressurized melt from a melt inlet to a first shear gate, said first shear gate being defined in a first shearing surface disposed in said first transfer bushing in a plane extending generally parallel to the direction of opening and closing movement of said first and second platens; and a second transfer bushing disposed in the second platen defining at least a portion of a second runner passage for conducting pressurized melt from a second shear gate to a distribution manifold, said second shear gate being defined in a second shearing surface disposed in said second transfer bushing in a plane extending generally parallel to said first shearing surface;

wherein said first and second shear gates are in communication to facilitate flow of pressurized melt from said first runner passage to said second runner passage when the first and second platens are in a closed position, and wherein said pressurized melt is sheared at said first and second shear gates by said first and second shearing surfaces when the first and second platens move from a closed position to an open position and wherein at least one of said first and second platens includes guide means to guide said transfer bushing of the other of said platens into close engagement with said transfer bushing of said at least one platen upon said mold moving to said closed position.

2. A melt transfer system as claimed in claim 1, wherein said first and second shear gates each have a circumferential edge forming an acute angle for cutting said melt.

3. A melt transfer system as claimed in claim 1, wherein at least one of said first and second shear gates has an acute angled circumferential edge for cutting said melt.

4. A melt transfer system as claimed in claim 3, wherein said at least one circumferential edge is defined by an inclined wall of said respective first or second runner passages.

5. The melt transfer system of claim 1, wherein each of said first and second platens include said guide means.

6. The melt transfer system of claim 5 wherein said guide means includes a respective camming surface.

7. The melt transfer system of claim 6 wherein each of aid first and second transfer bushings include a stem and said stems are parallel.

8. The melt transfer system of claim 7 wherein said stems are co-axially aligned.

9. A melt transfer system as claimed in claim 6, wherein said first and second transfer bushings define a respective following surface that engages camming surface.

10. A melt transfer system for a stack mold having a first platen and a second platen, the second platen moving between an open position and a closed position relative to the first platen and cooperating with the first platen to define at least one mold cavity when in said closed position, the melt transfer system comprising:

a first runner passage defined in the first platen for conducting a pressurized melt from a melt inlet to a first shear gate;

a second runner passage defined in the second platen for conducting said pressurized melt from a second shear gate to a distribution manifold;

a first transfer bushing defining at least a portion of said first runner passage and having a first shearing surface into which said first shear gate is defined;

a second transfer bushing defining at least a portion of said second runner passage and having a second shearing surface into which said second shear gate is defined, said first and second shearing surfaces contacting each other when said first and second platens are in a closed position;

means for moving at least one of said first and second transfer bushings between a flow position, where said first and second platens are in a closed position and said first and second shear gates are in communication to facilitate flow of pressurized melt from said first runner passage to said second runner passage, and a shear position, where melt at said first shear gate is sheared by said second shearing surface and melt at said second shear gate is sheared by said first shearing surface to prevent flow of pressurized melt from said first runner passage to said second runner passage, wherein at least one of said first and second transfer bushings is rotatable by said moving means about an axis, and wherein said first or second shear gate defined in said rotatable first or second transfer bushing is eccentric to said rotation axis to form an eccentric first or second gate.

11. A melt transfer system as claimed in claim 10, wherein said first or second runner passage defined through said rotatable first or second transfer bushing is coaxial with said eccentric first or second gate.

12. A melt transfer system as claimed in claim 10, wherein said first or second runner passage of said rotatable first or second transfer bushing has a center portion that extends along said rotation axis and an eccentric portion that extends along a center axis of said eccentric first or second gate, said eccentric portion and said center portion being communicatively connected by a transverse portion.

13. A melt transfer system as claimed in claim 10, wherein each of said first and second runner passages has a center portion extending along said rotation axis and an eccentric portion extending along a second axis that is parallel to and eccentric from said rotation axis, said center portion and said eccentric portion being communicatively connected by a transverse portion, and wherein said first and second shear gates are defined respectively in said first and second shearing surfaces at said eccentric portions of said first and second runner passages.

14. A melt transfer system for a stack mold having a first platen and a second platen, the second platen moving between an open position and a closed position relative to the first platen and cooperating with the first platen to define at least one mold cavity when in said closed position, the melt transfer system comprising:

a first transfer nozzle and a first transfer bushing disposed in said first platen to define at least a portion of a first runner passage for conducting a pressurized melt from an inlet to a first shear gate, said first transfer bushing having a first bearing surface into which said first shear gate is defined;

a second transfer nozzle and a second transfer bushing disposed in said second platen for defining at least a portion of a second runner passage for conducting said pressurized melt from a second shear gate to a distribution manifold, said second transfer bushing having a second bearing surface into which said second shear gate is defined, said first and second bearing surfaces contacting each other when said first and second platens are in a closed position;

means for supporting at least one of said first and second transfer bushings in said first and second platens for movement relative to said first and second transfer nozzles;

means for moving at least one of said first or second transfer bushings relative to said first or second transfer nozzles between a flow position, where said first and second platens are in a closed position and said first and second shear gates are aligned to facilitate flow of pressurized melt from said first runner passage to said second runner passage, and a shear position, where said first shear gate is sealed by said second bearing surface and said second shear gate is sealed by said first bearing surface to prevent flow of pressurized melt from said first runner passage to said second runner passage.

15. A melt transfer system as claimed in claim 14, wherein a divided portion is defined in at least one of said first and second runner passages at an interface between said respective first or second transfer nozzles and said first or second transfer bushings, said divided portion defining a plurality of passages for conducting said pressurized melt, said passages in said first or second transfer nozzle communicating with said passages in said first or second transfer bushing when said system is in said flow position, and said passages being sealed from communication with said system in said shear position.

16. A melt transfer system as claimed in claim 15, wherein at least one of said first and second transfer bushings is rotatable by said moving means about an axis, and wherein said first or second shear gate defined in said rotatable first or second transfer bushing assembly is eccentric to said rotation axis to form an eccentric first or second gate.

17. A melt transfer system as claimed in claim 16, wherein said first or second runner passage defined through said rotatable first or second transfer bushings is coaxial with said eccentric first or second gate.

18. A melt transfer system as claimed in claim 16, wherein said first or second runner passage of said rotatable first or second transfer bushings has a center portion that extends along said rotation axis and an eccentric portion that extends along a center axis of said eccentric first or second gate, said eccentric portion and said center portion being communicatively connected by a transverse portion.

19. A melt transfer system as claimed in claim 16, wherein each of said first and second runner passages has a center portion extending along said rotation axis and an eccentric portion extending along a second axis that is parallel to and said eccentric from said rotation axis, said center portion and said eccentric portion being communicatively connected by a transverse portion, and said first and second shear gates are defined respectively in said first and second bearing surfaces at said eccentric portions of said first and second runner passages.

* * * * *